United States Patent
Christensson et al.

(10) Patent No.: US 6,560,332 B1
(45) Date of Patent: May 6, 2003

(54) METHODS AND APPARATUS FOR IMPROVING ECHO SUPPRESSION IN BI-DIRECTIONAL COMMUNICATIONS SYSTEMS

(75) Inventors: Nils Christensson, Malmö (SE); John Philipsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/313,636

(22) Filed: May 18, 1999

(51) Int. Cl.[7] .............................................. H04M 9/08
(52) U.S. Cl. .......................... 379/406.05; 379/406.01; 379/406.02; 379/406.03; 379/406.07; 379/406.06; 379/406.08; 379/406.09
(58) Field of Search ....................... 379/406.01–406.16

(56) References Cited

U.S. PATENT DOCUMENTS

| | | | |
|---|---|---|---|
| 4,621,173 A | | 11/1986 | Guidoux |
| 4,965,822 A | | 10/1990 | Williams |
| 4,969,144 A | | 11/1990 | Blackwell et al. |
| 5,131,032 A | * | 7/1992 | Esaki et al. |
| 5,327,496 A | | 7/1994 | Russell et al. |
| 5,561,668 A | | 10/1996 | Genter |
| 5,617,423 A | * | 4/1997 | Li et al. |
| 5,859,907 A | | 1/1999 | Kawahara et al. |
| 5,933,494 A | * | 8/1999 | Yang et al. |
| 6,163,608 A | * | 12/2000 | Romsburg et al. |

FOREIGN PATENT DOCUMENTS

| | | | | |
|---|---|---|---|---|
| WO | WO98/06185 | 2/1998 | | |
| WO | WO98/47276 | 10/1998 | | |
| WO | WO-200180439 A1 | * 10/2001 | ............ | H04B/3/23 |

* cited by examiner

Primary Examiner—Forester W. Isen
Assistant Examiner—Ramnandan Singh
(74) Attorney, Agent, or Firm—Burns, Doane, Swecker & Mathis, L.L.P.

(57) ABSTRACT

In methods and apparatus for echo cancellation, a noise estimate is selectively added to a downlink communications signals to improve the convergence speed and stability of an echo-canceling adaptive filter. The added signal content enables the echo-canceling adaptive filter to more quickly track echo path changes during user communications and prevents divergence of the adaptive filter during periods in which the downlink signal does not contain information (e.g., speech) sufficient to develop a quality echo path estimate. To prevent performance degradation from a user perspective, the added noise is made to resemble existing system noise (e.g., either near-end or far-end background noise). In exemplary embodiments, filter convergence speed and stability are further improved by whitening the spectrum and increasing the power level of the added noise whenever a near-end user is active and masking the added noise.

25 Claims, 4 Drawing Sheets

METHODS AND APPARATUS FOR IMPROVING ECHO SUPPRESSION IN BI-DIRECTIONAL COMMUNICATIONS SYSTEMS

FIELD OF THE INVENTION

The present invention relates to communications systems, and more particularly, to echo suppression in bi-directional communications systems.

BACKGROUND OF THE INVENTION

Adaptive filtering arrangements are prevalent in communications systems of today. Such arrangements are typically used to reduce or remove unwanted signal components and/or to control or enhance signal components of interest.

A common example of such a filtering arrangement relates to hands-free telephony, wherein the built-in earphone and microphone of a conventional telephone handset are replaced with an external loudspeaker and an external microphone, respectively, so that the telephone user can converse without having to physically hold the telephone unit in hand. Since sound emanating from the external loudspeaker can be picked up by the external microphone, adaptive filtering is commonly performed in order to prevent the loudspeaker output from echoing back and annoying the far-end user at the other end of the conversation. This type of adaptive filtering, or echo canceling, has become a basic feature of the full-duplex, hands-free communications devices of today.

Typically, echo cancelation is achieved by passing the loudspeaker signal through an adaptive Finite Impulse Response (FIR) filter which approximates, or models, the acoustic echo path between the hands-free loudspeaker and the hands-free microphone (e.g., a passenger cabin in an automobile hands-free telephony application). The FIR filter thus provides an echo estimate which can be removed from the microphone output signal prior to transmission to the far-end user. The filtering characteristic (i.e., the set of FIR coefficients) of the adaptive FIR filter is dynamically and continuously adjusted, based on both the loudspeaker input and the echo-canceled microphone output, to provide a close approximation to the echo path and to track changes in the echo path (e.g., when a near-end user of an automobile hands-free telephone shifts position within the passenger cabin).

Adjustment of the filtering characteristic is commonly achieved using a form of the well known Least Mean Square (LMS) adaptation algorithm developed by Widrow and Huff in 1960. The LMS algorithm is a least square stochastic gradient step method which, as it is both efficient and robust, is often used in many real-time applications. The LMS algorithm and its well known variations (e.g., the Normalized LMS, or NLMS algorithm) do have certain drawbacks, however. For example, the LMS and other known algorithms can sometimes be slow to converge (i.e., approach the target filtering characteristic, such as the acoustic echo path in a hands-free telephony application), particularly when the algorithm is adapted, or trained, based on a non-white, or colored, input signal.

As a result, echo cancelers utilizing the LMS or other adaptive algorithms can temporarily allow significant residual echo to pass back to a far-end user whenever the true echo path is changing or unknown (e.g., upon first installation of a handsfree device). Moreover, known adaptive algorithms tend to diverge during periods in which the far-end user is not speaking (i.e., when the energy content of the loudspeaker signal is insufficient to provide a basis for developing a quality echo estimate). Consequently, significant residual echo can also be temporarily passed back to the far-end user each time the far-end user begins to speak after having been silent for a period of time.

To reduce residual echo immediately following first installation of a device in a new and acoustically unknown environment, conventional systems often employ an initialization sequence to train the echo canceler before the device is used for actual communications. Specifically, an artificial audio signal (typically white noise) is played through the loudspeaker, and the echo canceler is given time to converge to the new echo path prior to a first call being made or received. However, such an approach does not address the above described problems associated with slow filter recovery time following changes in the echo path or following periods of far-end user silence. Thus, there is a need for improved methods and apparatus for providing echo cancelation in communications systems.

SUMMARY OF THE INVENTION

The present invention fulfills the above-described and other needs by providing echo canceling techniques wherein a noise signal is selectively added to a downlink (e.g., loudspeaker) signal to thereby improve adaptive filter convergence speed. Advantageously, the added signal content enables an echo-canceling adaptive filter to more quickly track echo path changes during user communications. Moreover, the added noise prevents divergence of the adaptive filter during periods in which the downlink signal does not contain information (e.g., far-end speech) sufficient for developing a good estimate of the echo path.

To prevent performance degradation from a user perspective, the added noise can be made to resemble existing system noise (e.g., either near-end or far-end background noise). For example, the power spectrum and level of existing near-end noise can be estimated in real-time, and the added noise can be generated having a similar or identical spectrum and a somewhat lower power level. Thus, a system constructed according to the invention can provide the benefits of enhanced filter convergence speed without creating user-perceptible differences in overall system operation.

Advantageously, filter adaptation speed can be further enhanced according to the invention by modifying characteristics of the added noise at appropriate times. For example, the spectrum of the added noise can be spread, and the power level of the added noise can be increased, whenever the near-end user of a handsfree telephone is speaking (and therefore effectively masking the added noise). Whitening and strengthening the added noise signal enables the adaptive echo-canceler to better identify the true echo path, and doing so only when the near-end user is speaking results in no performance degradation (i.e., no user-perceptible changes in overall system operation).

An exemplary communications device according to the invention includes an adaptive echo canceler receiving a near-end audio signal and providing an echo-canceled near-end signal for transmission to a far-end user via a communications channel, adaptive filtering coefficients of the adaptive echo canceler being dynamically adjusted in dependence upon the echo-canceled near-end signal and upon a reference signal. The exemplary communications device further includes a noise estimation processor receiving a far-end audio signal via the communications channel and providing the reference signal to the adaptive echo canceler, the noise estimation processor producing the reference signal by selectively adding noise to the far-end audio signal. For example, the noise estimation processor can include a voice activity detector for determining whether the far-end audio signal includes speech of the far-end user, and can thus add noise to the far-end audio signal only during periods in which the far-end audio signal does not include speech of the far-end user.

To prevent degradation of system performance from the user perspective, the noise added to the far-end audio signal can be an estimate of noise present in one of the near-end and far-end environments of the device. Additionally, a level of the noise added to the far-end audio signal can be made slightly less than an estimated level of the noise present in the near-end environment.

To further improve adaptive echo canceler performance, the noise estimation processor can include a voice activity detector for determining whether the near-end audio signal includes speech of the near-end user. Thus, the noise estimation processor can modify the noise added to the far-end audio signal when the near-end audio signal includes speech of the near-end user. For example, the noise added to the far-end audio signal can be whitened when the near-end audio signal includes speech of the near-end user. Additionally, a power level of the noise added to the far-end audio signal can be increased when the near-end audio signal includes speech of the near-end user.

An exemplary method of echo suppression according to the invention includes the steps of filtering a near-end audio signal to provide an echo-canceled near-end signal for transmission to a far-end user via a communications channel, dynamically adjusting filtering coefficients used in the filtering step in dependence upon the echo-canceled near-end signal and upon a reference signal, and selectively adding noise to a far-end audio signal to provide the reference signal used in the adjusting step. The step of selectively adding noise can, for example, include the steps of determining whether the far-end audio signal includes speech of the far-end user, and adding noise to the far-end audio signal only during periods in which the far-end audio signal does not include far-end user speech.

Additionally, the step of adding noise to the far-end audio signal can include the steps of estimating noise present in one of a near-end and a far-end environment, and adding noise which is audibly similar to the estimated noise to the far-end audio signal. A level of the noise added to the far-end audio signal can, for example, be made slightly less than an estimated level of the noise present in the near-end environment.

The exemplary method can further include the steps of determining whether the near-end audio signal includes speech of the near-end user, and modifying the noise added to the far-end audio signal when the near-end audio signal includes speech of the near-end user. For example, the added noise can be whitened when the near-end audio signal includes speech of the near-end user. Additionally, a power level of the added noise can be increased when the near-end audio signal includes speech of the near-end user.

The above-described and other features and advantages of the invention are explained in detail hereinafter with reference to the illustrative examples shown in the accompanying drawings. Those of skill in the art will appreciate that the described embodiments are provided for purposes of illustration and understanding and that numerous equivalent embodiments are contemplated herein.

DETAILED DESCRIPTION OF THE INVENTION

Figure 1:
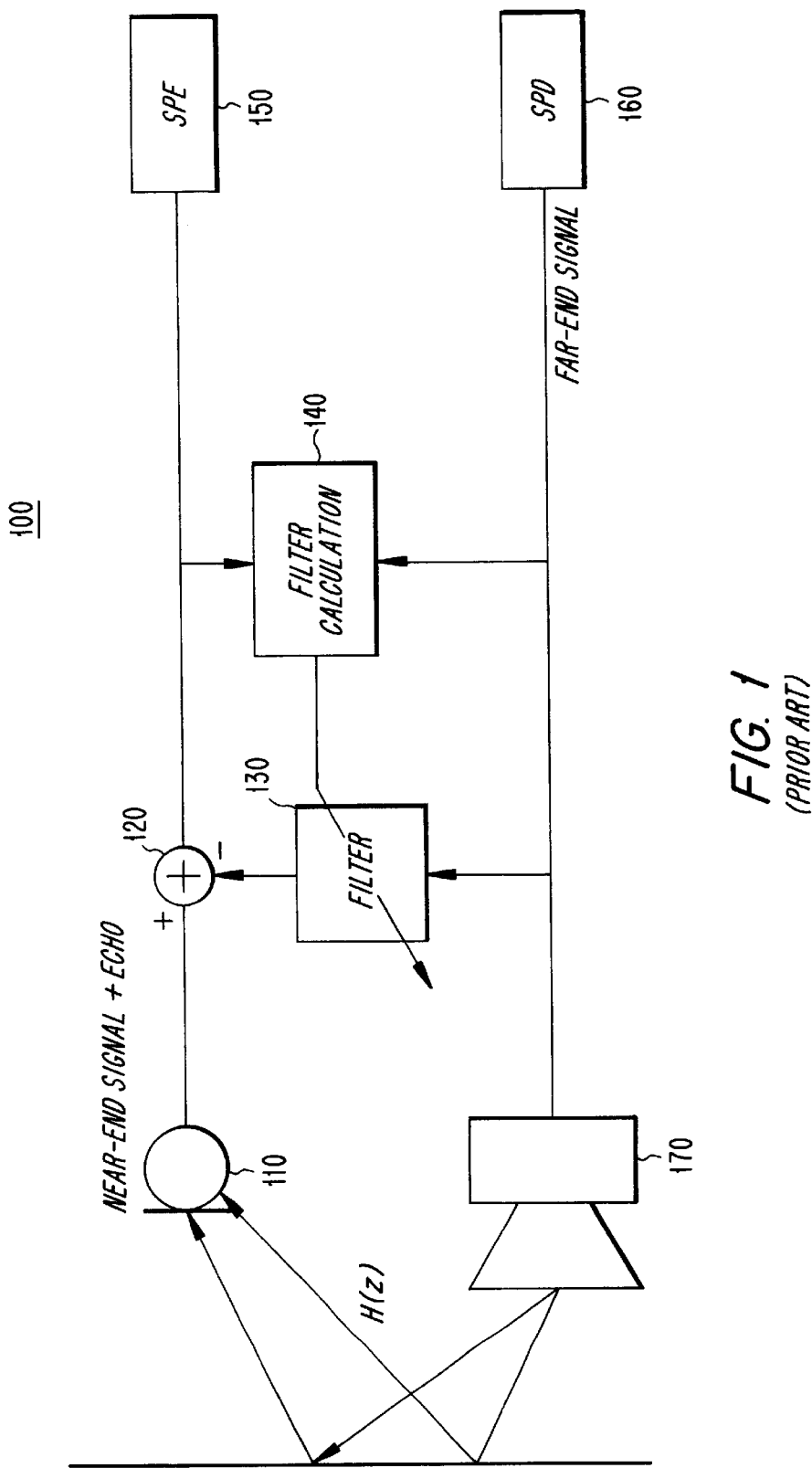
FIG. 1 is a block diagram of an exemplary hands-free telephony system incorporating a conventional echo canceling arrangement.

FIG. 1 depicts bi-directional communications device 100 including a conventional echo-canceling arrangement. As shown, the system 100 includes a microphone 110, a summing device 120, an adaptive filter 130, a filter computation processor 140, a speech encoder 150, a speech decoder 160, and a loudspeaker 170. Those of ordinary skill in the art will appreciate that the below described functionality of the components of FIG. 1 can be implemented using a variety of known hardware configurations, including a general purpose digital computer, standard digital signal processing components, and/or one or more application-specific integrated circuits (ASICs). Those of ordinary skill will also appreciate that, in practice, the exemplary system 100 includes components (e.g., an analog-to-digital converter at the output of the microphone 110 and a digital-to-analog converter at the input to the loudspeaker 170) which are omitted from FIG. 1, as they are not critical to an understanding of the present invention.

In FIG. 1, an audio output of the microphone 110 is coupled to an additive input of the summing device 120, and an output of the summing device 120 is coupled to an input of the speech encoder 150 and to an input of the filter computation processor 140. Additionally, an output of the speech decoder 160 is coupled to a second input of the filter computation processor 140 and to an input of each of the adaptive filter 130 and the loudspeaker 170. An output of the filter computation processor 140 is coupled to a control input of the adaptive filter 130, and an output of the adaptive filter 130 is coupled to a subtractive input of the summing device 120.

In operation, a coded far-end audio signal, including speech of a far-end user (not shown), is decoded via the decoder 160 and input to the loudspeaker 170 for presentation to a near-end user (also not shown). The loudspeaker output is then echoed back to the microphone 110 via an unknown and sometimes changing echo path, as is indicated by a variable transfer function H(z) in FIG. 1. Thus, audio output from the microphone 110 includes loudspeaker echo, as well as near-end user speech and near-end background noise.

To prevent the loudspeaker echo from reaching and annoying the far-end user, the FIR filter 130 filters the loudspeaker signal to provide an estimate of the loudspeaker echo received at the microphone 110, and the resulting echo estimate is subtracted from the microphone output via the summing device 120. Echo-canceled output from the summing device 120 is then encoded via the encoder 150 and transmitted to the far-end user.

At the same time, the echo-canceled output is fed back to the filter computation processor 140 for use in adapting the filter coefficients, or taps, of the FIR filter 130 such that they converge toward and track the true echo path H(z). As is well known in the art, the filter computation processor 140 computes filter coefficient updates based on both the echo-canceled output, or error, signal and the loudspeaker input, or reference, signal (e.g., using an LMS or NLMS algorithm). As is also well known in the art, coefficient updates can be computed either on a sample by sample basis or on a sample block by sample block basis.

Ideally the arrangement of FIG. 1 provides a quality echo estimate, and the far-end user is not distracted by delayed echoes of his or her own voice. However, as is described in the above Background of the Invention, the adaptive algorithm (i.e., the algorithm implemented in the filter computation processor 140) can require a non-negligible amount of time to adjust to changes in the near-end echo path (e.g., when a handsfree microphone is repositioned or when the near-end user moves). Moreover, the far-end audio signal can at times (e.g., during periods when the far-end user is silent) include insufficient content to prevent the adaptive algorithm from diverging away from the true echo path. As a result, significant residual echo can reach the far-end user during and immediately following periods in which the echo path is changing and/or the far-end user is not speaking.

According to the present invention, however, noise is added to the loudspeaker signal during communications to improve adaptive filter convergence speed and thereby reduce the residual echo experienced by the far-end user, even during and immediately following periods of echo path change and/or far-end user silence. Adding noise content to the loudspeaker signal enables the adaptive filter to more quickly track echo path changes and prevents divergence of the adaptive filter during periods in which the far-end user is not speaking. In other words, by adding noise to the loudspeaker signal, more energy is directed through the near-end echo path, thereby providing a stronger basis for developing and maintaining an accurate filtering characteristic (and therefore a more accurate echo estimate).

To prevent performance degradation from a user perspective (i.e., to prevent either user from hearing and being distracted by the additional noise), the added noise can be made to resemble already-existing system noise. For example, the power spectrum and level of noise present in either the near-end or far-end environment can be estimated in real-time (using known estimation techniques), and the noise to be added to the loudspeaker signal can be generated having a similar or identical spectrum and a somewhat lower power level. Consequently, neither user will identify the loudspeaker output as a noise source.

To further improve adaptive filter convergence speed, the spectrum of the generated noise can be whitened, or spread, before the noise is added to the loudspeaker signal to provide the filter reference signal. Whitening the noise signal (and thus the reference signal) serves to excite the adaptive algorithm over a broader signal space and thus results in improved filter performance. Whitening can be accomplished, for example, via forward prediction-error filtering, as is well known in the art. See, for example, Simon Haykin, Adaptive Filter Theory, Third Edition, Prentice Hall Information and System Science Series, 1996.

So that the users do not perceive a difference between the added noise and the existing system noise, the whitening can be performed, for example, only when the near-end user is speaking and therefore audibly masking the added noise. Indeed, when the near-end user is speaking, the added noise can be increased in power as well. By strengthening and whitening the added noise (and thus the reference signal) only when the near-end user is speaking, identification of the echo path is improved without degrading overall system performance.

Figure 2:
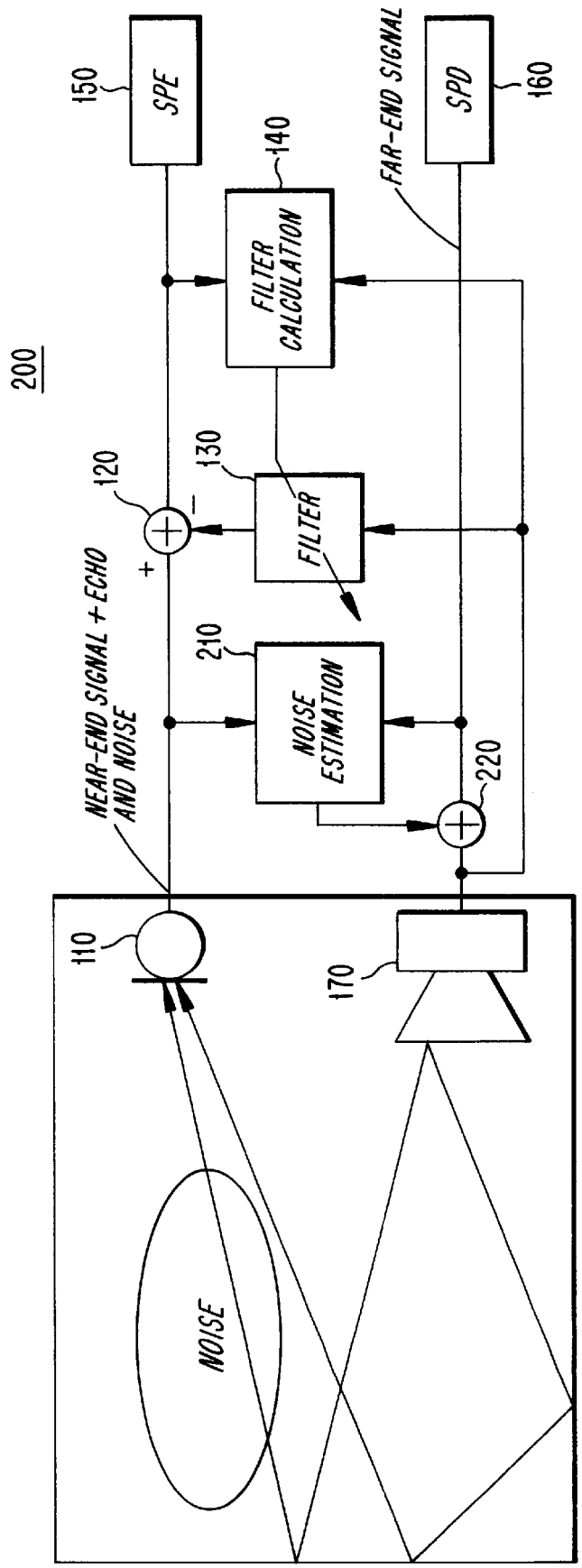
FIG. 2 is a block diagram of an exemplary hands-free telephony system incorporating an echo canceling arrangement according to the invention.

FIG. 2 depicts a bi-directional communications system 200 in which the above described aspects of the invention can be incorporated. As shown, the exemplary system 200 includes a noise estimation processor 210 and a second summing device 220, as well as the microphone 110, the first summing device 120, the adaptive filter 130, the filter computation processor 140, the speech encoder 150, the speech decoder 160, and the loudspeaker 170 of FIG. 1. As with FIG. 1, those of ordinary skill in the art will appreciate that the below described functionality of the components of FIG. 2 can be implemented using a variety of known hardware configurations, including a general purpose digital computer, standard digital signal processing components, and one or more ASICs. In practice, the exemplary system 200 includes components (e.g., an analog-to-digital converter at the output of the microphone 110 and a digital-to-analog converter at the input to the loudspeaker 170) which are omitted from FIG. 2, as they are not critical to an understanding of the present invention.

In FIG. 2, an audio output of the microphone 110 is coupled to the additive input of the first summing device 120 and to a first input of the noise estimation processor 210. Output of the first summing device 120 is coupled to the input of the speech encoder 150 and to the first input of the filter computation processor 140. The output of the speech decoder 160 is coupled to a first additive input of the second summing device 220 and to a second input of the noise estimation processor 210. An output of the noise estimation processor 210 is coupled to a second additive input of the second summing device 220, and an output of the second summing device 220 is coupled to the reference inputs of the adaptive filter 130 and the filter computation processor 140. Output of the filter computation processor 140 is coupled to the control input of the adaptive filter 130, and the echo estimate output of the adaptive filter 130 is coupled to the subtractive input of the first summing device 120.

Generally, operation of the system 200 of FIG. 2 is similar to that of the system 100 of FIG. 1. In other words, the FIR filter 130 and the filter computation processor 140 operate to provide an echo estimate which is subtracted from the microphone output signal to provide an echo-canceled near-end audio signal to the far-end user. Unlike the system 100 of FIG. 1, however, the far-end audio signal is not fed directly to the loudspeaker 170 or to the reference inputs of the adaptive filter 130 and the filter computation processor 140. Instead, the noise estimation processor 210 generates a noise signal, in dependence upon the near-end and far-end audio signals, which is added to the far-end audio signal (via the summing device 220) to provide the reference, or training, signal to the adaptive filter 130 and the filter computation processor 140. Consequently, the noise estimation processor 210 can provide the above described advantages relating to improved filter convergence speed without performance degradation.

For example, the noise estimation processor can include well known voice activity detectors (VADs) to determine when the near-end and far-end users are speaking. Thus, an estimate of either the near-end or far-end background noise can be updated (using known estimation techniques) when the near-end user or the far-end user is silent, respectively. Further, modeled noise (e.g., noise resembling either the near-end or far-end background noise) can be added to the far-end audio signal only when the far-end user is silent (e.g., in situations where the far-end speech provides a sufficient filter training signal and enhancement is therefore desired only when far-end speech is absent). Additionally, the added noise can be whitened and strengthened, as described above, whenever the near-end user is speaking (and effectively masking the added noise signal).

Figure 3:
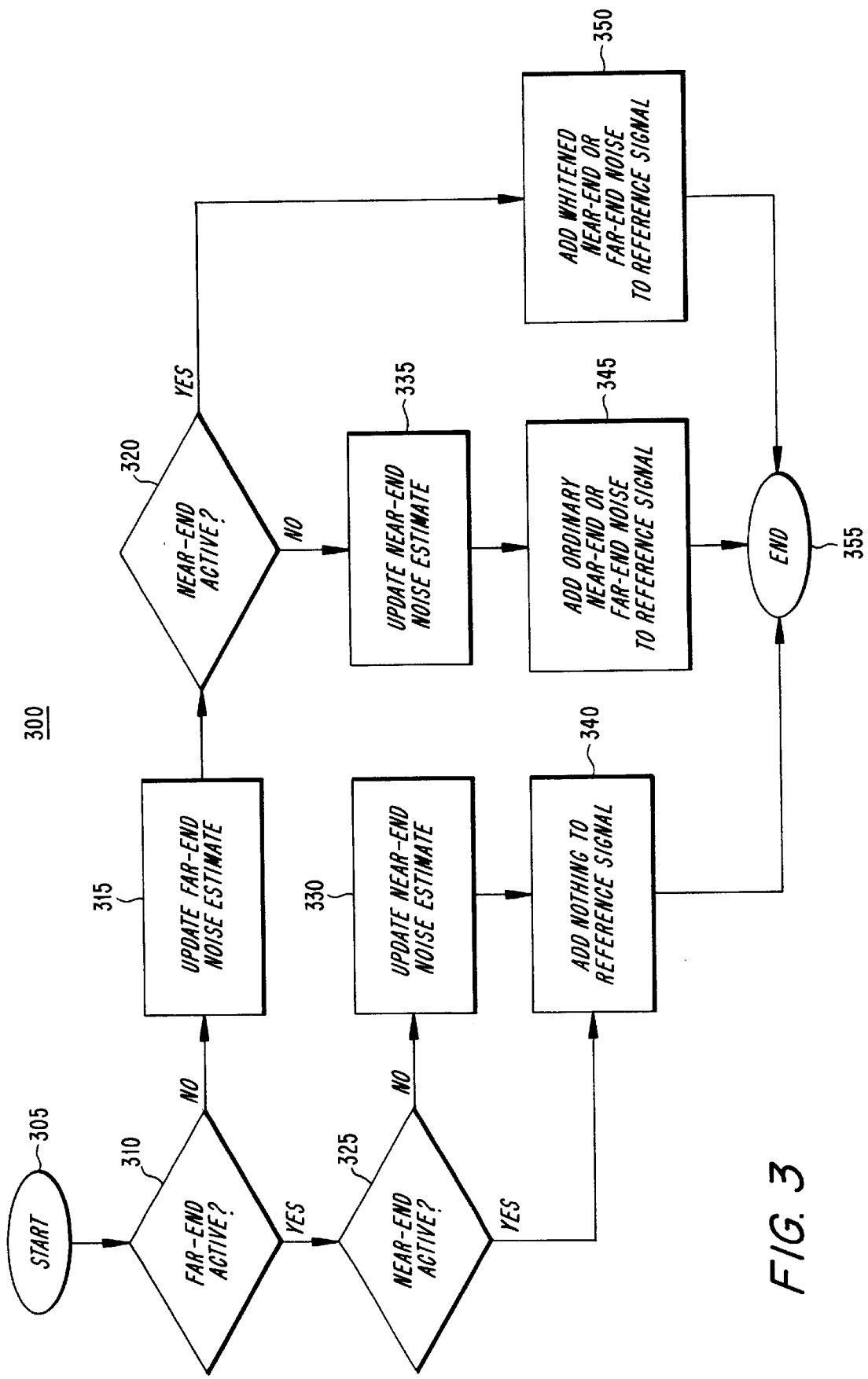
FIG. 3 is a flow diagram depicting steps in an exemplary method of echo cancellation according to the invention.
Figure 4:
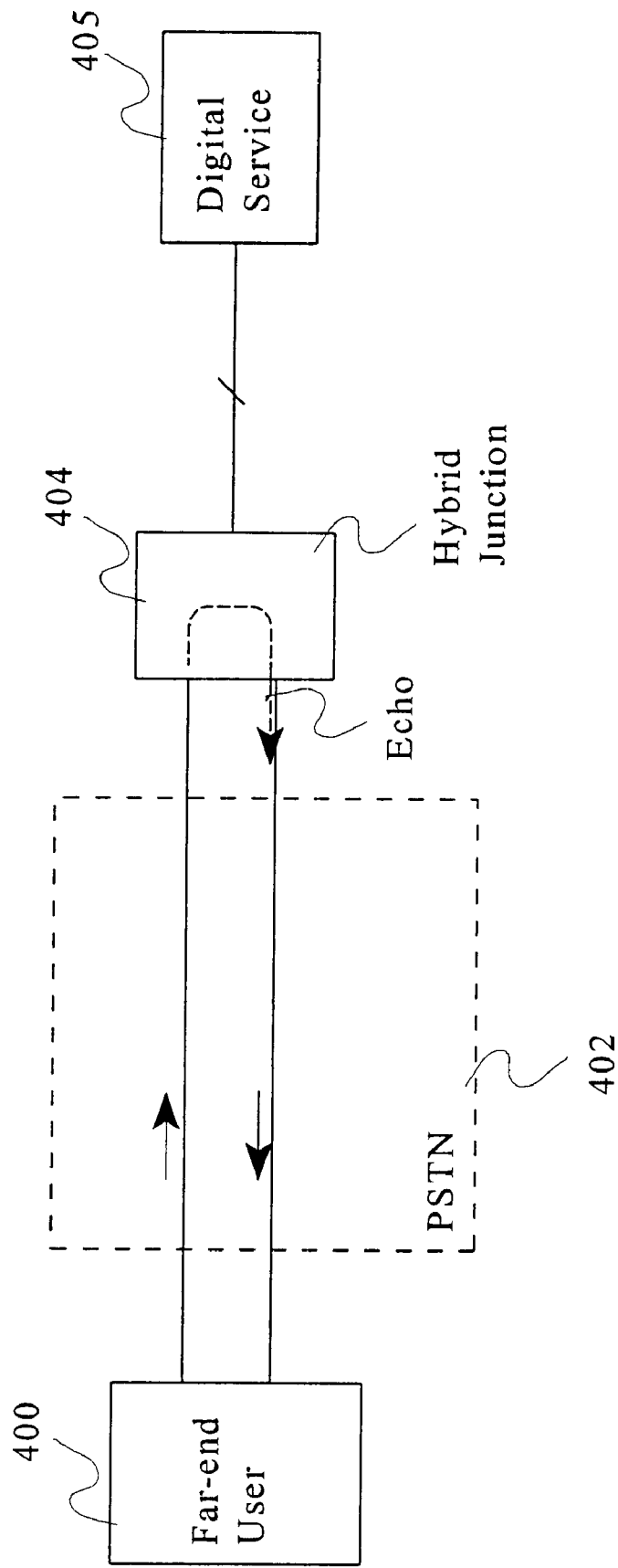
FIG. 4 is a is a block diagram of an exemplary telephony system incorporating an echo canceling arrangement according to the invention.

FIG. 3 depicts steps in an exemplary method 300 for providing an adaptive filter reference signal according to the invention. The exemplary method 300 can be implemented, for example, in blockwise fashion (i.e., executed once for each of a succession of audio signal sample blocks) within the noise estimation processor 210 of FIG. 2.

In FIG. 3, the method 300 begins at step 305, and a determination is made at step 310 as to whether the far-end user is speaking. If so, then a determination is made at step 325 as to whether the near-end user is also speaking. If the both the far-end and near-end users are speaking, then no noise is added to the loudspeaker signal in providing the filter reference signal (step 340), and the method 300 ends at step 355. However, if the far-end user is speaking and the near-end user is silent, then the near-end noise estimate is updated at step 330, but still nothing is added to the loudspeaker signal in providing the reference signal (step 340) before the method 300 ends at step 355.

If it is determined at step 310 that the far-end user is not speaking, then the far-end noise estimate is updated at step 315, and a determination is made at step 320 as to whether the near-end user alone is speaking. If the near-end user is also silent, then the near-end noise estimate is also updated at step 335, and an unmodified (i.e., unwhitened and unstrengthened) noise signal resembling the near-end noise or the far-end noise (or a combination thereof) is added to the loudspeaker signal in providing the adaptive filter reference signal (step 345) before the method ends at step 355. However, if it is determined at step 320 that the near-end user alone is speaking, then a strengthened and whitened noise signal resembling one or both of the near-end and far-end background noise is added to the loudspeaker signal in providing the reference signal (step 350) before the method 300 ends at step 355.

Generally, the invention provides methods and apparatus for improving echo canceler convergence speed and stability. By selectively adding noise to a downlink signal during communications, echo cancelation is improved without degrading system performance from a user perspective. The benefits provided by the techniques of the invention are particularly useful in contexts where the far-end environment is quiet (i.e., where the far-end signal includes relatively little content upon which a quality echo estimate can be based).

Those skilled in the art will appreciate that the present invention is not limited to the specific exemplary embodiments which have been described herein for purposes of illustration and that numerous alternative embodiments are also contemplated. For example, although the exemplary embodiments have been described with respect to acoustic echo cancelation in the context of hands-free telephony, the disclosed adaptation-enhancement techniques are equally applicable to network echo cancelation (i.e., where echoes result from impedance mismatches at a hybrid junction between a digital device and an analog network). The scope of the invention is therefore defined by the claims appended hereto, rather than the foregoing description, and all equivalents consistent with the meaning of the claims are intended to be embraced therein.

We claim:

1. A communications device for providing bi-directional audio communications between a near-end user and a far-end user via a bi-directional communications channel, comprising:

an adaptive echo canceler receiving a near-end audio signal and providing an echo-canceled near-end signal for transmission to the far-end user via the communications channel, wherein adaptive filtering coefficients of said adaptive echo canceler are dynamically adjusted in dependence upon the echo-canceled near-end signal and upon a reference signal; and a noise estimation processor receiving a far-end audio signal via the communications channel and providing the reference signal to said adaptive echo canceler, wherein said noise estimation processor produces the reference signal by selectively adding noise to the far-end audio signal.

2. A communications device according to claim 1, wherein said noise estimation processor includes a voice activity detector for determining whether the far-end audio signal includes speech of the far-end user, and wherein said noise estimation processor adds noise to the far-end audio signal only during periods in which the far-end audio signal does not include speech of the far-end user.

3. A communications device according to claim 1, wherein the near-end user and the far-end user are situated in a near-end environment and a far-end environment, respectively, and wherein the noise added to the far-end audio signal is an estimate of noise present in one of the near-end and far-end environments.

4. A communications device according to claim 3, wherein a level of the noise added to the far-end audio signal is less than an estimated level of the noise present in the near-end environment.

5. A communications device according to claim 1, wherein said noise estimation processor includes a voice activity detector for determining whether the near-end audio signal includes speech of the near-end user, and wherein the noise added to the far-end audio signal is modified when the near-end audio signal includes speech of the near-end user.

6. A communications device according to claim 5, wherein the noise added to the far-end audio signal is whitened when the near-end audio signal includes speech of the near-end user.

7. A communications device according to claim 5, wherein a power level of the noise added to the far-end audio signal is increased when the near-end audio signal includes speech of the near-end user.

8. A communications device according to claim 1, wherein said adaptive echo canceler is an acoustic echo canceler, wherein the near-end audio signal is a near-end microphone output signal, and wherein the reference signal is used to feed a near-end loudspeaker.

9. A communications device according to claim 1, wherein said adaptive echo canceler is a network echo canceler, wherein the near-end audio signal is output from a hybrid junction, and wherein the reference signal is input to the hybrid junction.

10. A communications device according to claim 1, wherein the filtering coefficients of said adaptive echo canceler are adjusted according to a Least Mean Squares (LMS) algorithm.

11. A method for suppressing echo in a bi-directional communications device, the device being configured to provide two-way audio communications between a near-end user and a far-end user via a bi-directional communications channel, the method comprising the steps of:

filtering a near-end audio signal to provide an echo-canceled near-end signal for transmission to the far-end user via the communications channel;

dynamically adjusting filtering coefficients used in said filtering step in dependence upon the echo-canceled near-end signal and upon a reference signal; and selectively adding noise to a far-end audio signal to provide the reference signal used in said adjusting step.

12. A method according to claim 11, wherein said step of selectively adding noise comprises the steps of:

determining whether the far-end audio signal includes speech of the far-end user; and adding noise to the far-end audio signal only during periods in which the far-end audio signal does not include speech of the far-end user.

13. A method according to claim 11, wherein the near-end user and the far-end user are situated in a near-end environment and a far-end environment, respectively, and wherein said step of adding noise to the far-end audio signal includes the steps of estimating noise present in one of the near-end and far-end environments and adding noise which is audibly similar to the estimated noise to the far-end audio signal.

14. A method according to claim 11, wherein a level of the noise added to the far-end audio signal is less than an estimated level of the noise present in the near-end environment.

15. A method according to claim 11, further comprising the steps of:

determining whether the near-end audio signal includes speech of the near-end user; and modifying the noise added to the far-end audio signal when the near-end audio signal includes speech of the near-end user.

16. A method according to claim 15, wherein said step of modifying the added noise includes the step of whitening the added noise when the near-end audio signal includes speech of the near-end user.

17. A method according to claim 15, wherein said step of modifying the added noise includes the step of increasing a power level of the added noise when the near-end audio signal includes speech of the near-end user.

18. A method according to claim 11, wherein the filtering coefficients are dynamically adjusted according to a Least Mean Squares (LMS) algorithm.

19. A handsfree telephone, comprising:

a near-end microphone receiving sound from a near-end telephone environment and providing a near-end audio signal;

an adaptive echo canceler receiving the near-end audio signal and providing an echo-canceled near-end signal for transmission to a far-end user via a communications channel, adaptive filtering coefficients of said adaptive echo canceler being dynamically adjusted in dependence upon the echo-canceled near-end signal and upon a reference signal;

a noise estimation processor receiving a far-end audio signal via the communications channel and providing the reference signal to said adaptive echo canceler, wherein said noise estimation processor produces the reference signal by selectively adding noise to the far-end audio signal; and a loudspeaker receiving the reference signal and providing sound to the near-end environment.

20. A handsfree telephone according to claim 19, wherein said noise estimation processor includes a voice activity detector determining whether the far-end audio signal includes speech of the far-end user, and wherein said noise estimation processor adds noise to the far-end audio signal only during periods in which the far-end audio signal does not include speech of the far-end user.

21. A handsfree telephone according to claim 19, wherein the noise added to the far-end audio signal is an estimate of noise present in one of the near-end environment and a far-end environment.

22. A handsfree telephone according to claim 19, wherein a level of the noise added to the far-end audio signal is less than an estimated-level of the noise present in the near-end environment.

23. A handsfree telephone according to claim 19, wherein said noise estimation processor includes a voice activity detector for determining whether the near-end audio signal includes speech of the near-end user, and wherein the noise added to the far-end audio signal is modified when the near-end audio signal includes speech of the near-end user.

24. A handsfree telephone according to claim 23, wherein the noise added to the far-end audio signal is whitened when the near-end audio signal includes speech of the near-end user.

25. A handsfree telephone according to claim 23, wherein a power level of the noise added to the far-end audio signal is increased when the near-end audio signal includes speech of the near-end user.

* * * * *